United States Patent
Ehrlich et al.

(10) Patent No.: US 6,264,286 B1
(45) Date of Patent: Jul. 24, 2001

(54) CONTROL MODULE FOR A BRAKE SYSTEM FOR A SEMI-TRAILER

(75) Inventors: Donald J. Ehrlich, Lafayette; Rodney P. Ehrlich, Monticello; Gerard Owen McCann, Lafayette, all of IN (US)

(73) Assignee: Wabash Technology Corporation, Arlington Heights, IL (US)

(*) Notice: Subject to any disclaimer, the term of this patent is extended or adjusted under 35 U.S.C. 154(b) by 0 days.

(21) Appl. No.: 09/306,921

(22) Filed: May 7, 1999

(51) Int. Cl.$^7$ .................................................. B60T 13/00
(52) U.S. Cl. .................................................. 303/7
(58) Field of Search ............... 303/7, 167, 123, 303/127, 118.1, 158, 159, 121, 157, 113.1; 188/181 R, 155

(56) References Cited

U.S. PATENT DOCUMENTS

| | | | |
|---|---|---|---|
| 4,017,125 | * 4/1977 | Durling | 303/7 |
| 4,546,437 | 10/1985 | Bleckmann et al. | |
| 4,700,304 | 10/1987 | Byrne et al. | |
| 4,784,444 | * 11/1988 | McCann | 303/118 |
| 4,916,698 | 4/1990 | McCann | |
| 5,518,308 | * 5/1996 | Sugawara | 303/169 |

OTHER PUBLICATIONS

ALKON Corporation, ALKON Series AQ Dot, pp. 3–6 and 12.
Weatherhead® Catalog No. 202f–F 6/95 96.7M, Dana Corporation, Compression, Copyright 1995, pp. 37–39 and last page.

* cited by examiner

Primary Examiner—Christopher P. Schwartz
Assistant Examiner—C. T. Bartz
(74) Attorney, Agent, or Firm—Trexler, Bushnell, Giangiorgi, Blackstone & Marr, Ltd.

(57) ABSTRACT

A brake system for an air braked trailer includes a first control line for transmitting air from a source, a second control line for transmitting air, a relay valve allowing air to flow therethrough, and a pneumatic control module (PCM) having structure for reducing pressure from an inlet port of the PCM to an outlet port of the PCM. The PCM is connected to the first control line and is solely connected to the relay valve by the second control line. The first and second control lines are capable of being decoupled from the PCM and being coupled to each other to remove the PCM from the system so that a technician can check the system. An exhaust valve is integrally connected with the PCM and is capable of exhausting air to atmosphere. When the system is used on trailer, the PCM is mounted away from the relay valve, and preferably forwardly of a forward axle of the trailer.

35 Claims, 8 Drawing Sheets

CONTROL MODULE FOR A BRAKE SYSTEM FOR A SEMI-TRAILER

BACKGROUND OF THE INVENTION

This invention is generally directed to a brake system for heavy truck trailers which use an air-braked system, and specifically to an antilock brake system for such a trailer.

In a conventional brake system without antilock brakes, when the driver presses the brake pedal, fluid is forced through conduits to the actual brake mechanism at each wheel. The fluid is pressurized and forces a stationary braking surface against a rotating surface which is attached to the wheel. This action slows the wheel through the effect of friction. The braking surfaces are the shoe linings for drum brakes and the pad linings for disk brakes. The rotating surfaces are, respectively, drums or rotors. The slowing wheel also slows the vehicle because of friction between the tire and the road surface. For hydraulic brakes, as used on all cars and smaller trucks, the working fluid is "brake fluid" which is an actual liquid. For large trucks, the working "fluid" is air, which is of course a mixture of gases.

A component known as the "relay valve" is a significant part of an air brake system on a trailer. This component "relays" a control air pressure signal from the driver's brake pedal in the cab to the brakes. This approach is dictated, fundamentally, by brake response time and economic considerations, and in practice by government regulation and industry standardization. The control line is a small diameter tube running the length of the vehicle combination which becomes pressurized when the driver applies the brakes. A separate source of compressed air also exists. This is the "power" air and a reserve is stored in a tank on the trailer. This power air flows to the brakes to effect the actual braking work. The relay valve isolates the control air signal from the power air. Additional complication is dictated by regulation and failure mode considerations.

A disadvantage with conventional brake systems is that the driver can press too hard for the prevailing conditions, for example when driving on snow or wet asphalt. This causes the wheels to stop rotating and to "lock." The vehicle does slow down, but directional control is lost, and, depending on which wheels lock, and on the road conditions, the vehicle may spin.

An anti-lock brake system (ABS) offers significant safety and control advantages over conventional braking systems and ABS is now in common use on most vehicle types. ABS prevents wheel lock-up and, in effect, control brake torques so that the tire to road interface makes most use of the available friction while at the same time providing a reasonable level of lateral stabilizing force. In an emergency or a panic braking situation, ABS functions by keeping the brake pressure at a level just below that which would cause the wheels to lock-up. The vehicle remains stable during emergency or panic braking—that is, the vehicle does not spin. In addition, the vehicle remains steerable during emergency or panic braking. In effect, ABS utilizes the available friction between the tires and the road while ensuring that a high side force (perpendicular to the direction of travel of the vehicle) is also available, thus providing vehicle stability and steerability. Stopping distances are shorter than with locked wheel stops under most conditions. Finally, the lifetime of the tire is increased when ABS is used.

A conventional ABS includes a wheel speed sensing mechanism, an electronic control module (ECM) and a modulation system which controls the brake actuation fluid (air for heavy trucks) pressure. The modulation system consists of one or more modulators and includes a pneumatic control module (PCM).

The wheel speed sensing mechanism, the ECM and the modulation system are additions to the conventional brake system which, for most vehicle types, remains largely unchanged. The wheel speed sensors determine the speed of the wheels and send this information, in an electrical format, to the ECM. The ECM analyzes the wheel speed information and, if appropriate, electrically signals the modulation system to prevent wheel lock-up. The modulation system responds to these signals and physically reduces the brake pressure to optimum level for the conditions. As noted above, the modulation system controls the brake air pressure. This control becomes active only during hard braking, and/or slick conditions, where the wheels would have stopped rotating (lock-up) in the absence of an anti-lock brake system.

The modulator used in the present invention, like the modulators for existing trailer systems, does not modify the power air pressure directly. Instead the modulator used in the present invention modifies the pressure of the control air signal going to the relay valve. The relay valve relays this controlled pressure signal to the power air which flows to the brake actuation mechanism. Thus, the modulator only has to handle the low air volume associated with the control signal, and not the higher volume of air associated with brake actuation.

With a conventional ABS, most of the components which constitute the PCM are integrated with the relay valve. The integrated unit is referred as the "antilock modulator" or the "relay modulator". The ECM and the PCM act together to reduce pressure to a level which minimizes or prevents wheel lock. In many cases, the ECM is also integrated with the relay modulator, or at least attached to the relay modulator with a bracket, so that the whole assembly may be supplied as a unit. The integrated relay valve/PCM is located as close as reasonably possible to, and approximately equidistant from, the brake chambers of the controlled wheels. The predominant semi-trailer type in the United States has four wheel sets so the anti-lock brake system is located in the suspension area between the two axles. This is not an easily accessible location.

The present invention instead integrates the PCM with the ECM and entirely separates the resulting Antilock Control Module (ACM) from the relay valve. The present invention also incorporates other features to make full us of this architecture as described herein. The system of the present invention can be used with relay valves from any manufacturer and provides the brake system designer with additional flexibility in defining the brake system architecture. Significant advantages are also presented to the service technician when the system of the present invention is used as described herein. Other features and advantages will be understood from a reading of the attached specification in combination with a study of the drawings.

OBJECTS AND SUMMARY OF THE INVENTION

A general object of the present invention is to provide a novel antilock brake system (ABS) for heavy truck trailers which use an air-braked system.

An object of the present invention is to provide a novel ABS which integrates a pneumatic control module with an electronic control module to form an antilock control module (ACM), such ACM being separated from the relay valve which is used to supply air from a reservoir to the brake chambers.

Another object of the present invention is to integrate a quick exhaust valve into the ACM for the rapid release of air from the system, and to periodically exhaust signal air to atmosphere, and to provide better release timing than a conventional check valve which would normally be incorporated into ABS.

Yet another object of the present invention is to provide a novel ABS which can be used with relay valves from any manufacturer and provides the brake system designer with additional flexibility in defining the brake system architecture.

A further object of the present invention is to position the ACM forwardly of the relay valve to place the ACM in a more accessible location for a technician to provide service.

Yet a further object of the present invention to provide the ability for a service technician to check the system for a malfunction.

Briefly, and in accordance with the foregoing, the present invention discloses an antilock brake system for an air braked trailer which includes a first control line for transmitting air from a source, a second control line for transmitting air, a relay valve allowing air to flow therethrough, and a pneumatic control module (PCM) having structure for reducing pressure from an inlet port of the PCM to an outlet port of the PCM. The PCM is connected to the first control line and is connected to the relay valve by the second control line. The first and second control lines are capable of being decoupled from the PCM and being coupled to each other to remove the PCM from the system so that a technician can check the system. An exhaust valve is integrally connected with the PCM and is capable of exhausting air to atmosphere. When the system is used on trailer, the PCM is mounted away from the relay valve, and preferably forwardly of a forward axle of the trailer.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

Figure 1:
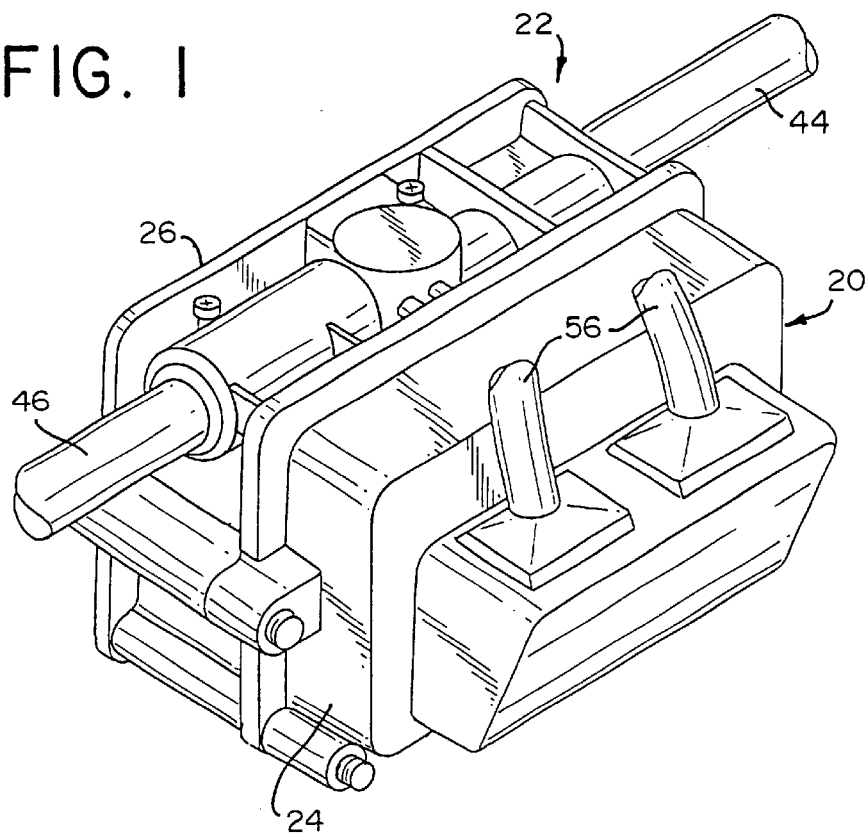
FIG. 1 is a perspective view of an antilock control module which incorporates the features of the invention.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

The present invention provides a novel integrated antilock control module (ACM) 20 used in a trailer antilock brake system (ABS) 22. The ACM 20 is shown in FIG. 1 and includes an electronic control module (ECM) 24 and a pneumatic control module (PCM) 26.

Figure 2:
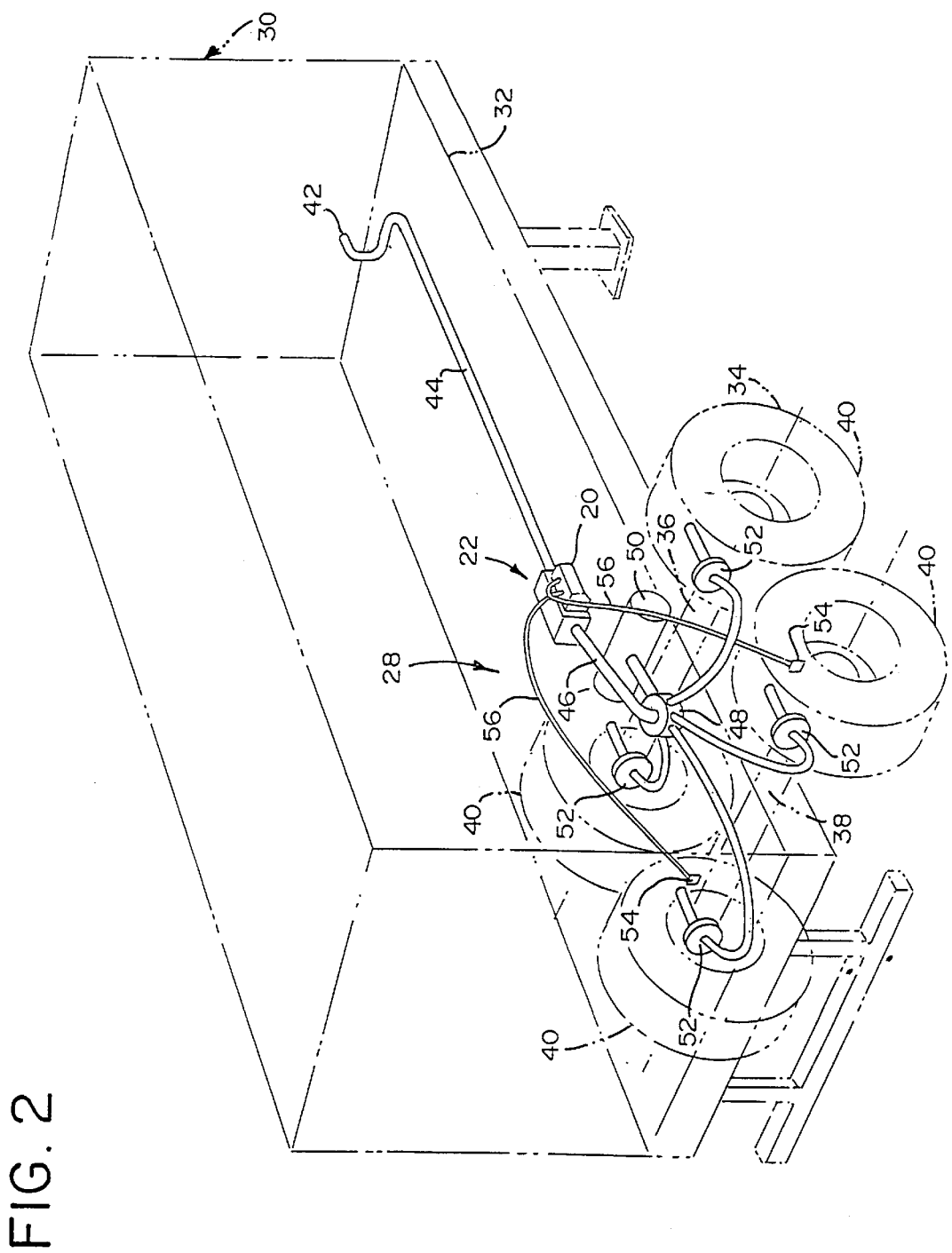
FIG. 2 is a perspective view of the antilock control module mounted on a trailer shown in phantom lines, such antilock control module being separated from a relay valve which is also shown mounted on the trailer.

FIG. 2 illustrates a conventional trailer 30 having an overall service brake system 28, which is described herein, installed thereon. A floor 32 of the trailer 30 is supported by a conventional rear undercarriage assembly 34. The undercarriage assembly 34 includes a forward axle 36 and a rearward axle 38, each axle 36, 38 having a pair of tires 40 mounted thereon by a conventional wheel mounting assembly (not shown). It is to be understood that four tires may be provided on each axle 36, 38 (with a pair being on each end of each axle 36, 38). In use, the trailer 30 is connected to a tractor (not shown) by conventional means, such as a fifth wheel assembly. A "glad hand" fitting 42 is provided at the front end of the trailer 30 and is used to connect the trailer 30 to the tractor. With this type of trailer 30, the brake pedal in the tractor is pneumatically connected to the glad hand fitting 42 by a line so that when a driver depresses the brake pedal, an air signal is sent to the glad hand fitting 42.

The service brake system 28 is an air braked system. A first control line 44 connects the glad hand fitting 42 to the PCM 26. A second control line 46 connects the PCM 26 to a conventional relay valve 48 and provides a direct fluid connection between the PCM 26 and the relay valve 48. The ACM 20 is mounted on the trailer 30 at a different position than the position of the relay valve 48 such that the ACM 20 and the relay valve 48 are separated from each other and are separate components of the system 28. The ACM 20 and the relay valve 48 are each mounted on the frame of the trailer 30 by suitable means. The relay valve 48 is located equidistant from the tires 40 of the trailer 30 between the forward and rearward axles 36, 38. The ACM 20 is located a predetermined distance away from the undercarriage assembly 34 and is preferably located at the forward of the undercarriage assembly 34, just ahead of the forward axle 36, as shown in FIG. 2. It is to be understood, however, that the ACM 20 can be mounted rearwardly of the tires 40. These locations for the ACM 20 are more accessible for a technician so that the technician can have better accessibility to provide ABS service. In addition, when the ACM 20 is mounted in the preferred forward position, wiring to the rest of the trailer 30 is easier. Also, because the relay valve 48 and the ACM 20 are separated from each other and are connected by the second control line 46, the trailer manufacturer, and ultimately the customer, can make separate purchasing decisions for the device to control ABS function and for the relay valve 48. The lengths of tubing which form the control lines 44, 46 can be cut to a desired length to suit the particular application. Other components, such as a valve (not shown), can also be connected to the second control line 46 by a branch line, but the PCM 26 and the relay valve 48 are in a direct fluid connection.

Figure 3:
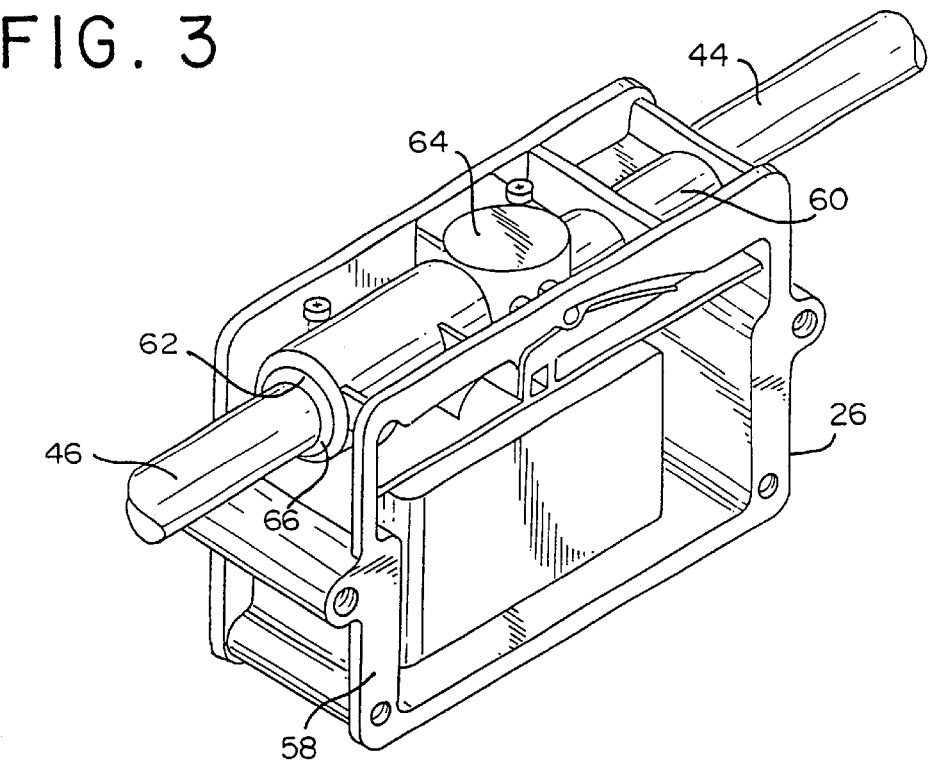
FIG. 3 is a perspective view of a pneumatic control module which forms part of the antilock control module.

Attention is now directed to FIG. 3 which illustrates the overall structure of the PCM 26. The PCM 26 has a housing 58 which has three ports—a supply port 60, a delivery port 62, and an exhaust port 64. The PCM 26 reduces pressure at its delivery port 62 below that at its supply port 60.

Figure 4:
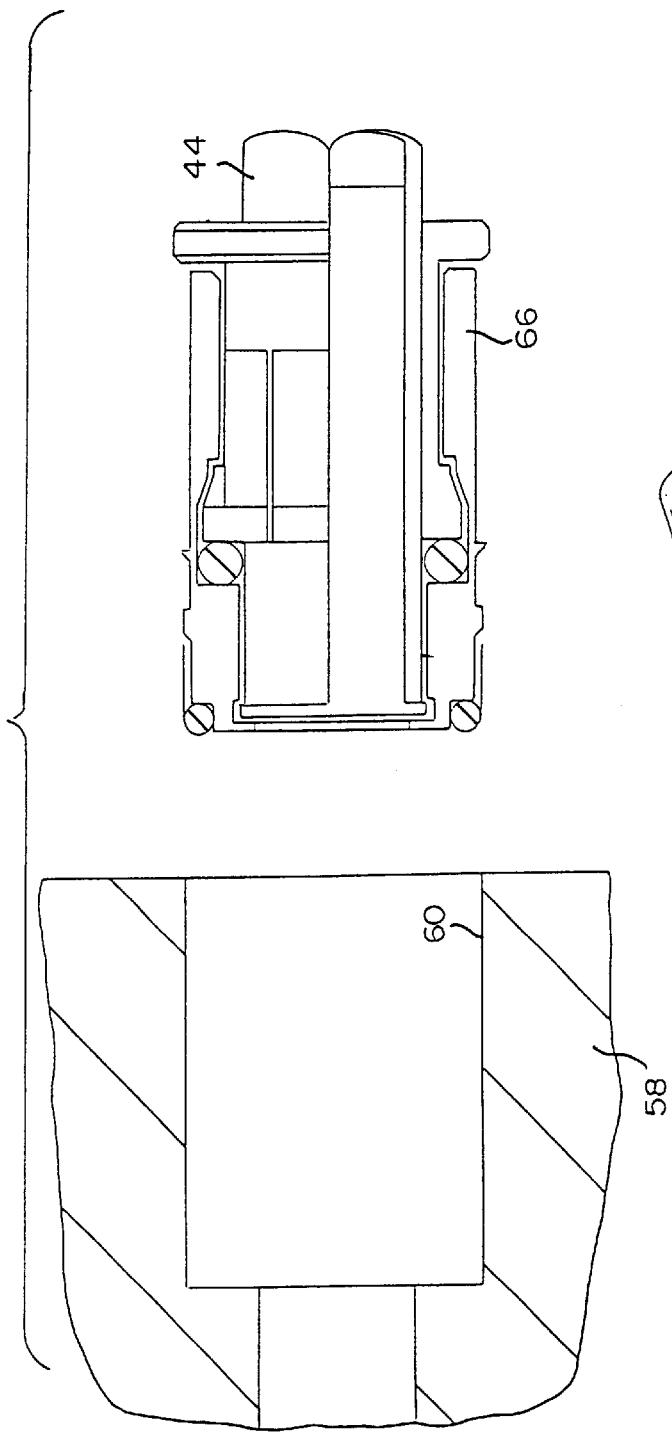
FIG. 4 is a partial cross-sectional view of a push in fitting which is used in the antilock control module.
Figure 5:
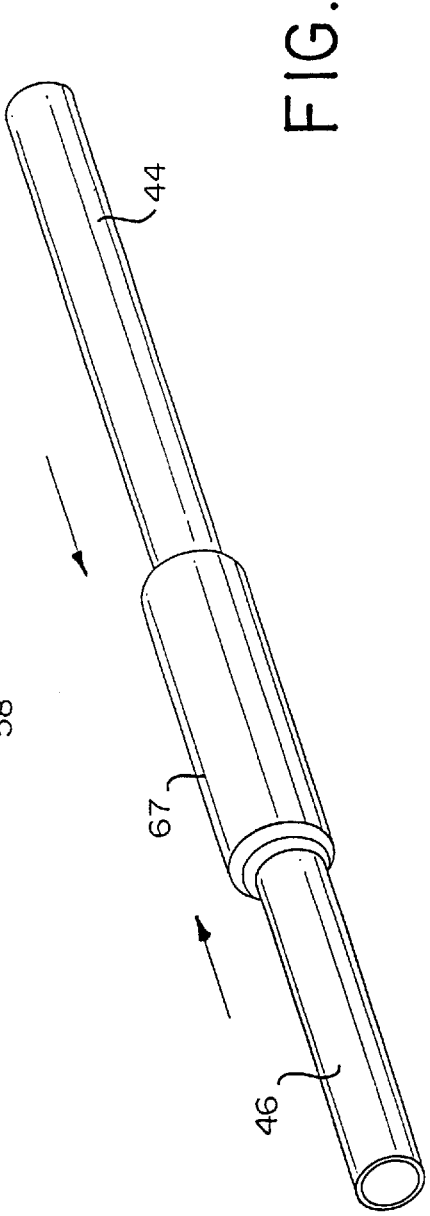
FIG. 5 is a perspective view of a portion of control lines connected to a union fitting.

As shown in FIGS. 3 and 4, the PCM 26 has conventional push-in fittings 66, such as ones that are manufactured by Alkon Corporation, which are mounted at its respective supply port 60 and delivery port 62 for connecting 3/8 inch air tubings which respectively form the first control line 44 and the second control line 46 from the glad hand fitting 42 to the PCM 26 and from the PCM 26 to the relay valve 48. Each 3/8 inch tubing 44, 46 is pushed into a push-in fitting 66 at the supply port 60 and at the delivery port 62 to make the respective connections between the PCM 26 and the first control line 44 and the PCM 26 and the second control line 46. The tubing 44, 46 can be released from the fitting 66 without the use of tools. Of course, if desired, tools may be used to release the tubing 44, 46 from the fitting. The push in fittings 66 provide a significant advantage in that if the brakes do not apply and release properly in service, then the technician is able to determine whether the problem is in the PCM 26 or in the relay valve 48. To do so, the technician disconnects the 3/8 inch tubing 44, 46 from the PCM 26 and connects the tubing 44, 46 to each other with a union fitting 67, see FIG. 5. This completely eliminates the PCM 26 from the service brake system 28. If the brakes still do not function correctly, the technician determines that the problem is with the relay valve 48 and either replaces or repairs the relay valve 48. Conversely, if the brakes now work correctly, the technician determines that the problem is with the PCM 26 and either replaces or repairs the PCM 26. This provides a considerable advantage over prior art systems where a similar problem would always be attributed to the integrated relay valve/PCM. As a result, in prior art systems the technician would replace the integrated relay valve/PCM. Because the integrated relay valve/PCM in prior art systems is in a location which is not easily accessible, the replacement or repair can be difficult. Replacing the integrated relay valve/PCM as would be performed in the prior art is much more costly than replacing a relay valve 48 or the PCM 26 as would be performed with the present invention. In the present invention, while replacement of the PCM 26 can be more expensive than replacing the relay valve 48, replacement of the PCM 26 is less expensive than the cost of replacing the combined relay valve/PCM used in the prior art. In addition, the PCM 26 used in the present invention is in a much more accessible location and thus, is easier to replace. It is to be understood that other types of connections between the PCM 26 and the tubing 44, 46 can be provided such as a compression fitting. If a compression fitting is used, however, a tool must be used to release the tubing 44, 46 from the respective fitting.

During a normal braking operation using the trailer 30 of FIG. 2, when the driver depresses the pedal, a pneumatic (air) control signal travels from the tractor to the glad hand fitting 42. The control signal travels along the first control line 44 from the glad hand fitting 42 to and through the PCM 26 of the ACM 20. The control signal is essentially unchanged by the ACM 20. The control signal then passes through the second control line 46 to the relay valve 48. The relay valve 48 allows air to flow from a supply reservoir 50 mounted on the trailer 30 to the brake chambers 52 until the pressure fed to the brake chambers 52 is essentially the same as the control pressure applied to the relay valve 48 from the second control line 46. If anti-lock activation is required to prevent wheel lock-up, the ECM 24 and the PCM 26 act together to reduce pressure to a level which minimizes or prevents wheel lock as described herein. Conventional wheel sensors 54 mounted on the trailer 30 sense the speed of the wheels 40 and feed information to the ECM 24 via lines 56.

Figure 6:
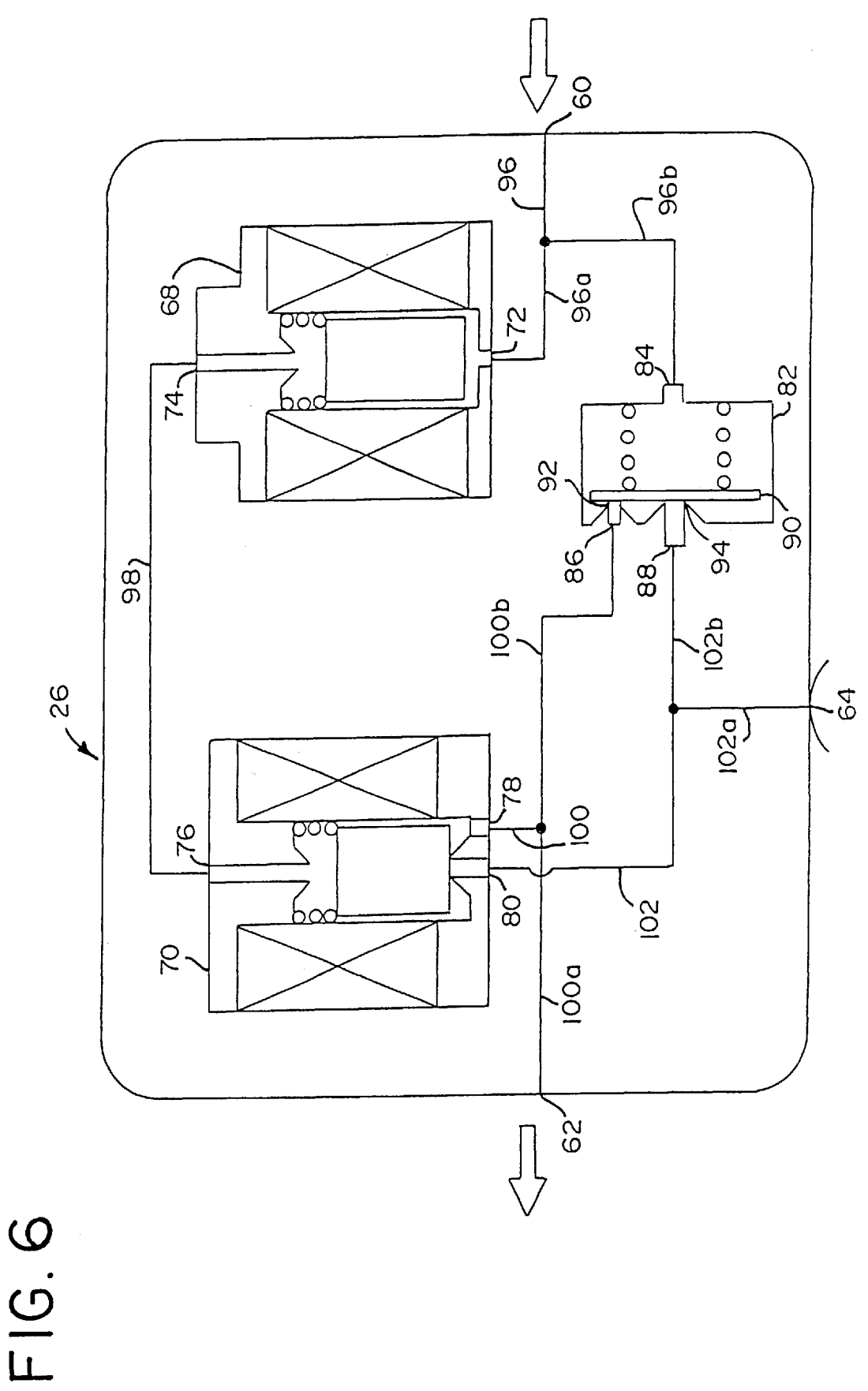
FIG. 6 is a schematic diagram of the elements of a first embodiment of the pneumatic control module which is used with the trailer shown in FIG. 2.
Figure 7:
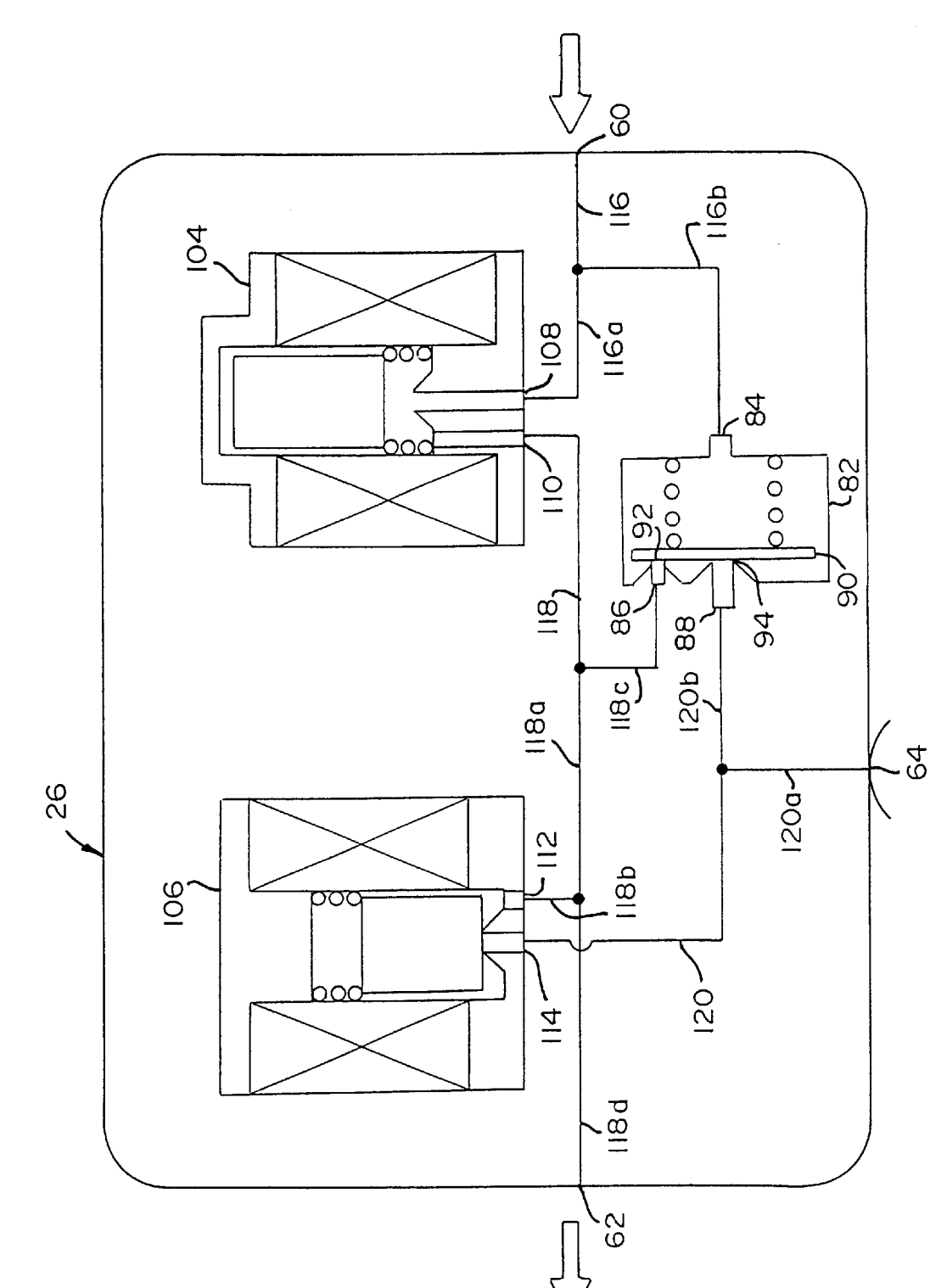
FIG. 7 is a schematic diagram of the elements of a second embodiment of the pneumatic control module which is used with the trailer shown in FIG. 2.
Figure 8:
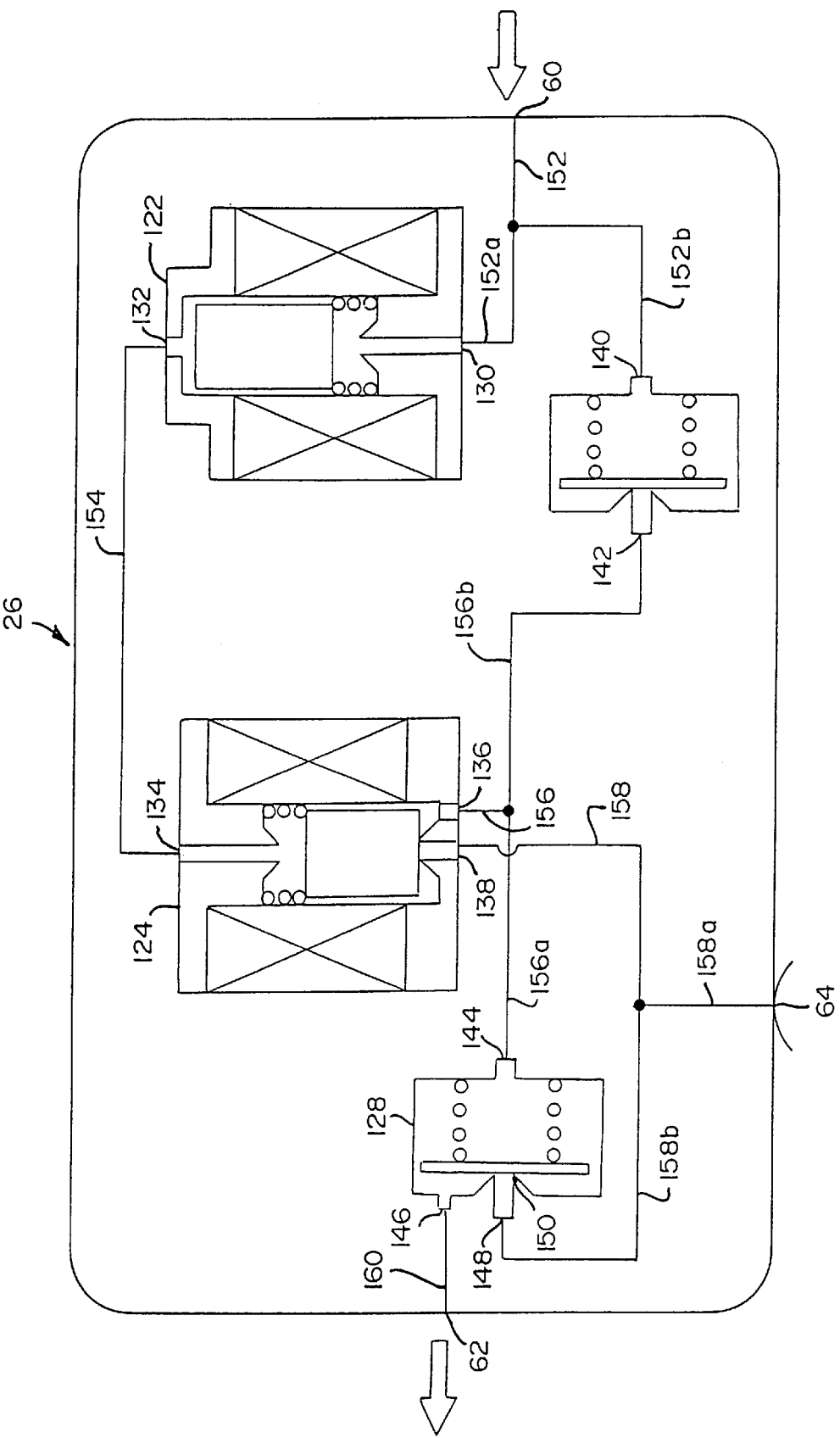
FIG. 8 is a schematic diagram of the elements of a third embodiment of the pneumatic control module which is used with the trailer shown in FIG. 2.

FIGS. 6, 7 and 8 illustrate first, second and third embodiments of the PCM 26 that can be used with the trailer 30 of FIG. 2. The PCM 26 shown in FIG. 6 is the preferred embodiment.

Directing attention to the embodiment of the PCM 26 in FIG. 6, a 2-way solenoid valve 68 and a 3-way solenoid valve 70 are provided therein to provide three usable states—delivery connected to supply, delivery pressure reducing (delivery connected to exhaust and supply blocked), and outlet pressure constant (both supply and delivery blocked).

The 2-way solenoid valve 68 used in the present embodiment has a housing having an inlet port 72 and an outlet port 74. A plurality of windings are housed within the housing and encircle a plunger which is biased away from the outlet port 74 by a spring and can be selectively moved against the outlet port 74 when the 2-way solenoid valve 68 is energized. In the non-energized position, the 2-way solenoid valve 68 is open such that the air signal can flow therethrough. That is, the inlet port 72 and outlet port 74 of the 2-way solenoid valve 68 are open in that the plunger is not biased against the outlet port 74.

The 3-way solenoid valve 70 has a housing having an inlet port 76, an outlet port 78, and an exhaust outlet port 80. A plurality of windings are housed within the housing and encircle a plunger which is biased away from the inlet port 76 and against the exhaust outlet port 80 by a spring and can be selectively moved against the inlet port 76 when the 3-way solenoid valve 70 is energized. In the non-energized position, the 3-way solenoid valve 70 is open such that the air signal can flow from the inlet port 76 to the outlet port 78 and the plunger is biased against the exhaust outlet port 80.

The PCM 26 also includes a novel quick exhaust valve 82 which is integrated therein. The quick exhaust valve 82 is formed from a housing having an inlet port 84, an exhaust inlet port 86, and an exhaust outlet port 88. A diaphragm 90 is housed within the housing and is normally biased against a seat 86 surrounding the exhaust inlet port 86 and a seat 94 surrounding the exhaust outlet port 88 by a spring mounted within the housing and which surrounds the inlet port 84. The spring 88 can be eliminated and the diaphragm 90 can solely be biased against the seat 86, 94 by fluid pressure. In addition, the diaphragm 90 can have guiding members attached thereto to guide it along its travel through the housing.

A line 96 is connected to the supply port 60 of the PCM 26 and has a first branch line 96*a* connected to the inlet port 72 of the 2-way solenoid valve 68 and a second branch line 96*b* connected to the inlet port 84 of the quick exhaust valve 82. A line 98 connects the outlet port 74 of the 2-way solenoid valve 68 to the inlet port 76 of the 3-way solenoid valve 70. The outlet port 78 of the 3-way solenoid valve 70 has a line 100 which has a first branch line 100*a* connected to the delivery port 62 of the PCM 26 and a second branch line 100*b* connected to the exhaust inlet port 86 of the quick exhaust valve 82. A line 102 is connected to the exhaust outlet port 80 of the 3-way solenoid valve 70 and is connected by first branch line 102a to the exhaust port 64 of the PCM 26 and by a second branch line 102b to the exhaust outlet port 88 of the quick exhaust valve 82.

During normal braking using the PCM 26 shown in FIG. 6, the following steps are effected:

1. Signal air passes in the supply port 60, and travels along lines 96, 96a to the inlet port 72 of the non-energized normally open 2-way solenoid valve 68.

2. The signal air passes through the inlet port 72 of the 2-way solenoid valve 74, around the plunger and out the outlet port 74.

3. The signal air passes along line 98 and through the inlet port 76 of the non-energized 3-way solenoid valve 70, around the plunger and out the outlet port 78.

4. The signal air then passes along lines 100, 100a to the delivery port 62 to the relay valve 48.

The quick exhaust valve 82 is not used during application of the brakes in normal braking. Pressure on the inlet port 84 side of the quick exhaust valve 82 is equal to pressure on the exhaust inlet port 86 and the exhaust outlet port 88 side of the diaphragm 92. The diaphragm 92 maintains its contact with the seats 92, 94 surrounding the exhaust inlet port 86 and the exhaust outlet port 88, thereby preventing flow in from line 100b.

5. When the driver releases the brakes, pressure is released off of the inlet port 84 side of the quick exhaust valve 82. The signal air returns through the delivery port 62 of the PCM 26. The signal air will follow the path of least resistance and will flow along lines 100a, 100b, into the exhaust inlet port 86 of the quick exhaust valve 82, out the exhaust outlet port 88, along lines 102b, 102a, and to the exhaust port 64 of the PCM at which point the returning air is vented to atmosphere. The pressure on the exhaust inlet port 86 and the exhaust outlet port 88 side of the quick exhaust valve 82 from the returning signal air is greater than the pressure on the inlet port 84 side of the quick exhaust valve 82 (since signal air is no longer being applied) which causes the spring force, or other biasing means used, to be overcome and to lift the diaphragm 90 off the seats 92, 94 so that the signal air can flow from the exhaust inlet port 86 to the exhaust outlet port 88. The returning signal air will travel through the quick exhaust valve 82 because the atmosphere is closer at the exhaust port 64 than at the air exhaust by the driver's foot. Some signal air may flow around the edges of the diaphragm 92 back to the supply port 60 of the PCM 26 through lines 96b, 96 and back to release at the driver's foot. All this contributes to a very rapid reduction in brake pressure.

During panic or emergency braking using the PCM 26, the following steps are effected:

1. Signal air flows through the PCM 26 as described above in steps 1–4 of normal braking. When the wheel sensors 54 sense that the wheel speed is too low and a lock-up is imminent because too much pressure is being applied, the ABS takes over. Electrical signals are sent from the wheel sensors 54 to the ECM 24 which activates the PCM 26.

2. The 3-way solenoid valve 70 is energized to vent air to atmosphere. The plunger moves and blocks the inlet port 76, thereby opening the exhaust outlet port 80.

3. Returning signal air from the relay valve 48 is exhausted to atmosphere by return flow through the delivery port 62 of the PCM 26. The returning signal air flows along lines 100a, 100 into the outlet port 78 of the 3-way solenoid valve 70 and out the exhaust outlet port 80. The returning signal air then flows along lines 102, 102a to the exhaust port 64 and is vented to atmosphere.

The quick exhaust valve 82 is not used. The backflow of air pressure on the exhaust inlet port 86 and the exhaust outlet port 88 side is insufficient to overcome the pressure on the inlet port 84 side from the signal air being applied thereto.

4. Once the wheel sensors 54 sense that the wheel speed has started to come back up, the 3-way solenoid valve 70 is de-energized so that the plunger moves against and blocks the exhaust outlet port 80. The 2-way solenoid valve 74 is then energized and the plunger is moved to block the outlet port 74. This holds the pressure constant in the PCM 26.

5. As the wheel starts to recover, the 2-way solenoid valve 74 is pulsed to give a controlled pressure re-application. Pressure jumps up to the point of imminent lock-up and the cycle is repeated starting at step 2 of this ABS sequence.

The advantage to using this arrangement in the 2-way solenoid valve 68 is that the plunger moves in the direction of forward flow, rather than against forward flow. The plunger is thus more inclined to be closed for large head pressures—when the driver presses hard on the brake pedal. When the 2-way solenoid valve 68 is pulsed, this results in the outlet pressure step sizes being more consistent. The greater head pressure tends to drive more air through for a particular pulse size, however, it also helps to close off the 2-way solenoid valve 68 when the 2-way solenoid valve 68 is again energized.

5. If the driver reduces the demand for brakes or suddenly releases the brakes when the solenoid valves 68, 70 are non-energized (2-way solenoid valve 68 has inlet and outlet ports 72, 74 open, and the 3-way solenoid valve 70 has the inlet port 76 and the outlet port 78 open and the exhaust outlet port 80 is blocked) during panic or emergency breaking, pressure is released off of the inlet port 84 side of the quick exhaust valve 82. The signal air returns through the delivery port 62 of the PCM 26. The returning signal air will follow the path of least resistance and will flow along lines 100a, 100b, into the exhaust inlet port 86 of the quick exhaust valve 82, out the exhaust outlet port 88 of the quick exhaust valve 82, along lines 102b, 102a, and to the exhaust port 64 and is vented to atmosphere. The pressure on the exhaust inlet port 86 and the exhaust outlet port 88 side of the quick exhaust valve 82 from the returning signal air is greater than the pressure on the inlet port 84 side of the quick exhaust valve 82 (since signal air is no longer being applied) which causes the spring force, or other biasing means being used, to be overcome and to lift the diaphragm 90 off the seats 92, 94 so that the signal air can flow from the exhaust inlet port 86 to the exhaust outlet port 88. The returning signal air will travel through the quick exhaust valve 82 because the atmosphere is closer at the exhaust port 64 than at the air exhaust by the driver's foot. Some signal air may flow around the edges of the diaphragm 90 back to the supply port 60 of the PCM 26 through lines 96b, 96 and back to release at the driver's foot. All this contributes to a very rapid reduction in brake pressure.

6. If the driver reduces the demand for brakes or suddenly releases the brakes when the 3-way solenoid valve 70 is energized (the inlet port 76 is blocked and the outlet port 78 and the exhaust outlet port 80 are open) during panic or emergency breaking, the returning signal air follows the path of least resistance. The returning signal air flows to atmosphere by returning in through the delivery port 62, along lines 100a, 100, through the outlet port 78 of the 3-way solenoid valve 70, through the exhaust outlet port 80, along lines 102, 102a to the exhaust port 64 and is vented to atmosphere. Some signal air may flow through the quick exhaust valve 82 as described hereinabove as pressure is relieved from the inlet port 84 side.

7. If the driver reduces the demand for brakes or suddenly releases the brakes when the 2-way solenoid valve 68 is energized (the outlet port 74 is blocked and the inlet port 72 is open) during panic or emergency breaking, pressure is released off the inlet port 84 side of the quick exhaust valve 82. The signal air returns through the delivery port 62 of the PCM 26. The signal air will follow the path of least resistance and will flow along lines 100a, 100b, through the exhaust inlet port 86 of the quick exhaust valve 82 as the diaphragm 90 is lifted off the seats 92, 94, through the exhaust outlet port 88 of the quick exhaust valve 82, along lines 102b, 102a, and out the exhaust port 64 to atmosphere. Some signal air may flow around the edges of the diaphragm 90 back to the supply port 60 of the PCM 26 through lines 96b, 96 and back to release at the driver's foot. All this contributes to a very rapid reduction in brake pressure.

Directing attention to the second embodiment of the PCM 26 in FIG. 7, the PCM 26 includes a first 2-way solenoid valve 104 which is normally open, and a second 2-way solenoid valve 106 which is normally closed.

The first 2-way solenoid valve 104 has a housing having an inlet port 108 and an outlet port 110. A plurality of windings are housed within the housing and encircle a plunger which is biased away from the inlet port 108 by a spring and can be selectively moved against the inlet port 108 when the 2-way solenoid valve 104 is energized. In the non-energized position, the 2-way solenoid valve 104 is open such that the air signal can flow therethrough. That is, the inlet port 108 and outlet port 110 are open in that the plunger is not biased against the inlet port 108.

The second 2-way solenoid valve 106 has a housing having an inlet port 112 and an outlet port 114. A plurality of windings are housed within the housing and encircle a plunger which is biased against the outlet port 114 by a spring and can be selectively moved away is from the outlet port 114 when the 2-way solenoid valve 106 is energized. In the non-energized position, the 2-way solenoid valve 106 is closed such that the air signal cannot flow therethrough. That is, the plunger is biased against and blocks the outlet port 114.

The PCM 26 also includes a novel quick exhaust valve 82 which is integrated therein and is identical in structure to the quick exhaust valve 82 used in the first embodiment of the PCM 26. Identical reference numerals are used to denote the elements of the quick exhaust valve 82.

A line 116 is connected to the supply port 60 and has a first branch line 116a connected to the inlet port 108 of the first 2-way solenoid valve 104 and a second branch line 116b connected to the inlet port 84 of the quick exhaust valve 82. A line 118 is connected to the outlet port 110 of the first 2-way solenoid valve 104, and has a first branch comprised of two lines 118a, 118b connected to the inlet port 112 of the second 2-way solenoid valve 106, has a second branch line 118c connected to the exhaust inlet port 86 of the quick exhaust valve 82, and a third branch line 118d connected to the delivery port 62 of the PCM. A line 120 is connected to the outlet port 114 of the second 2-way solenoid valve 106 and has a first branch line 120a connected to the exhaust port 64 and a second branch line 120b connected to the inlet port 86 of the quick exhaust valve 82. Branch lines 120b, 120a connect the outlet port 88 of the quick exhaust valve 82 to the exhaust port 64.

During normal braking using the PCM 26, the following steps are effected:

1. Signal air passes in the supply port 60 of the PCM 26, and travels along lines 116, 116a to the inlet port 108 of the first, non-energized normally open 2-way solenoid valve 104.

2. The signal air passes through the inlet port 108 and out the outlet port 110 of the first 2-way solenoid valve 104.

3. The signal air passes along lines 118, 118a, 118d and out the delivery port 62 of the PCM 26 to the relay valve 48.

The second 2-way solenoid valve 106 is not used during application of the brakes in normal braking since it is normally closed.

The quick exhaust valve 82 is not used during application of the brakes in normal braking. Pressure on the inlet port 84 side of the quick exhaust valve 82 is equal to pressure on the exhaust inlet port 86 and the exhaust outlet port 88 side of the diaphragm 90. The diaphragm 90 maintains its contact with the seats 92, 94 surrounding the exhaust inlet port 86 and the exhaust outlet port 88, thereby preventing flow in from line 118c.

4. When the driver releases the brakes, pressure is released off of the inlet port 84 side of the quick exhaust valve 82. The signal air returns through the delivery port 62 of the PCM 26. The signal air will follow the path of least resistance and will flow along lines 118d, 118c, into the exhaust inlet port 86 of the quick exhaust valve 82, out the exhaust outlet port 88 of the quick exhaust valve 82, along lines 120b, 120a, and to the exhaust port 64, thereby venting the returning air to atmosphere. The pressure on the exhaust inlet port 86 and the exhaust outlet port 88 side of the quick exhaust valve 82 from the returning signal air is greater than the pressure on the inlet port 84 side of the quick exhaust valve 82 (since signal air is no longer being applied) which causes the spring force, or other biasing means used, to be overcome and to lift the diaphragm 90 off the seats 92, 94 so that the signal air can flow from the exhaust inlet port 86 to the exhaust outlet port 88. The returning signal air will travel through the quick exhaust valve 82 because the atmosphere is closer at the exhaust port 64 than at the air exhaust by the driver's foot. Some signal air may flow around the edges of the diaphragm 90 back to the supply port 60 of the PCM 26 through lines 116b, 116 and back to release at the driver's foot. All this contributes to a very rapid reduction in brake pressure.

During panic or emergency braking, the following steps are effected:

1. Signal air flows through the PCM 26 as described above in steps 1–3 of normal braking. When the wheel sensors 54 sense that the wheel speed is too low and a lock-up is imminent because too much pressure is being applied, the ABS takes over. Electrical signals are sent from the wheel sensors 54 to the ECM 24 which activates the PCM 26.

2. The first and second 2-way solenoid valves 104, 106 are energized to vent air to atmosphere. When the first 2-way solenoid valve 104 is energized, the plunger moves and blocks the inlet port 108. In the second 2-way solenoid valve 106, the plunger moves and opens the outlet port 114 (with the inlet port 112 always being open).

3. Returning signal air from the relay valve 48 is exhausted to atmosphere by return flow through the delivery port 62 of the PCM 26. The returning signal air flows along lines 118d, 118b into the inlet port 112 of the second 2-way solenoid valve 106 and out the outlet port 114 of the second 2-way solenoid valve 106. The returning signal air then flows along lines 120, 120a to the exhaust port 64 and is vented to atmosphere.

The quick exhaust valve 82 is not used. The backflow of air pressure on the exhaust inlet port 86 and exhaust out port 88 side is insufficient to overcome the pressure on the inlet port 84 side from the signal air being applied.

4. Once the wheel sensors 54 sense that the wheel speed has started to come back up, the first and second 2-way solenoid valves 104, 106 are de-energized. As the wheel starts to recover, the first two-way solenoid valve 104 is pulsed to give a controlled pressure re-application. Two-valve solenoid valve 106 is de-energized at this time. Pressure jumps up to the point of imminent lock-up and the cycle is repeated starting at step 2 of this ABS sequence.

5. If the driver reduces the demand for brakes or suddenly releases the brakes when the first and second solenoid valves 104, 106 are non-energized during panic or emergency breaking, pressure is released off of the inlet port 84 side of the quick exhaust valve 82. The signal air returns through the delivery port 62 of the PCM 26. The returning signal air will follow the path of least resistance and will flow along lines 118d, 118a, 118c, into the exhaust inlet port 86 of the quick exhaust valve 82, out the exhaust outlet port 88 of the quick exhaust valve 82, along lines 120b, 120a, and to the exhaust port 64 and is vented to atmosphere. The pressure on the exhaust inlet port 86 and the exhaust outlet port 88 side of the quick exhaust valve 82 from the returning signal air is greater than the pressure on the inlet port 84 side of the quick exhaust valve 82 (since signal air is no longer being applied) which causes the spring force, or other biasing means used, to be overcome and to lift the diaphragm 90 off the seats 92, 94 so that the signal air can flow from the exhaust inlet port 86 to the exhaust outlet port 88 of the quick exhaust valve 82. The returning signal air will travel through the quick exhaust valve 82 because the atmosphere is closer at the exhaust port 64 than at the air exhaust by the driver's foot. Some signal air may flow around the edges of the diaphragm 90 back to the supply port 60 of the PCM 26 through lines 116b, 116 and back to release at the driver's foot. All this contributes to a very rapid reduction in brake pressure.

6. If the driver reduces the demand for brakes or suddenly releases the brakes when the first and second 2-way solenoid valves 104, 106 are energized during panic or emergency breaking, the returning signal air follows the path of least resistance. The returning signal air flows to atmosphere by returning in through the delivery port 62 of the PCM 26, along lines 118d, 118b, through the inlet port 112 of the second 2-way solenoid valve 106, through the outlet port 114 of the second 2-way solenoid valve 106, along lines 120, 120a to the exhaust port 64 and is vented to atmosphere.

In the second embodiment, because two 2-way solenoid valves 104, 106 are used, easier pneumatic connections are provided than in the first embodiment. On the other hand, because both solenoid valves 104, 106 need to be activated to effect quick exhaust, this presents a disadvantage over the first embodiment because the system uses more energy to run.

The quick exhaust valve 82 used in the first and second embodiments differs from conventional quick exhaust valves. With a conventional quick exhaust valve, the two states are forward flow with the exhaust blocked, and the quick exhaust mode which connects the exhaust inlet port to the exhaust outlet port. With the quick exhaust valve 82 used in these embodiments, there is no forward flow because if forward flow was allowed, the signal air would not pass through the solenoid valves 68, 70; 104, 106 and ABS control could not be effected.

In addition, the integrated quick exhaust valve 82 used in the first and second embodiments exhausts signal air in the relay valve 48 and in the second control 46 line between the PCM 26 and the relay valve 48 to atmosphere rather than having to travel all the way to the tractor when the driver takes his foot off the brake. This quick exhaust function is active whether or not the system is in ABS mode. The quick exhaust function periodically exhausts signal air to atmosphere and helps to provide better release timing than a conventional check valve which would normally be incorporated into ABS. With a conventional ABS, the signal air in the last section of the control line to the antilock relay may only get changed when the ABS activates. With a careful driver this may be infrequently. Exhausting this signal air to atmosphere from time to time as provided in the present invention cycles new air through the system 28 and helps to get rid of alcohol and other contaminants. Alcohol is sometimes introduce to air brake systems in an attempt to avoid freeze ups in cold conditions. A side effect of this is that the alcohol and other contaminants can attack certain elastomers which may be components of the system.

Directing attention to the embodiment of FIG. 8, the PCM 26 includes a 2-way solenoid valve 122 and a 3-way solenoid valve 124 therein. In addition, a check valve 126 and a conventional quick exhaust valve 128 are integrated into the PCM 26.

The 2-way solenoid valve 122 used in the present embodiment has a housing having an inlet port 130 and an outlet port 132. A plurality of windings are housed within the housing and encircle a plunger which is biased away from the inlet port 130 by a spring and can be selectively moved against the inlet port 130 when the 2-way solenoid valve 122 is energized. In the non-energized position, the 2-way solenoid valve 122 is open such that the air signal can flow therethrough. That is, the inlet port 130 and outlet port 132 of the 2-way solenoid valve 122 are open in that the plunger is not biased against the inlet port 130.

The 3-way solenoid valve 124 has a housing having an inlet port 134, an outlet port 136, and an exhaust outlet port 138. A plurality of windings are housed within the housing and encircle a plunger which is biased away from the inlet port 134 and against the exhaust outlet port 138 by a spring and can be selectively moved against the inlet port 134 when the 3-way solenoid valve 124 is energized. In the non-energized position, the 3-way solenoid valve 124 is open such that the air signal can flow from the inlet port 134 to the outlet port 136 and the plunger is biased against the exhaust outlet port 138.

The check valve 126 is integrated into the PCM 26 and is formed from a housing having a first port 140 and a second port 142. A diaphragm is housed within the housing and is normally biased against the second port 142 by a spring mounted within the housing. The spring surrounds the first port 140. The spring can be eliminated and the diaphragm can solely be biased against the second port 142 by fluid pressure. In addition, the diaphragm can have guiding members attached thereto to guide it along its travel through the housing.

The quick exhaust valve 128 is integrated into the PCM 26 and is formed from a housing having an inlet port 144, a two-way port 146 and an exhaust outlet port 148. A diaphragm is housed within the housing and is normally biased against a seat 150 surrounding the exhaust outlet port 148 by a spring mounted within the housing. The spring surrounds the inlet port 144. Forward flow through the quick exhaust valve 128 is permitted by flow from the inlet port 144, around the diaphragm and out the two-way port 146. The spring can be eliminated and the diaphragm can solely be biased against the seat 150 by fluid pressure. In addition, the diaphragm can have guiding members attached thereto to guide it along its travel through the housing.

A line 152 is connected to the supply port 60 of the PCM 26 and has a first branch line 152*a* connected to the inlet port 130 of the 2-way solenoid valve 122 and a second branch line 152*b* connected to the inlet port 140 of the check valve 126. A line 154 connects the outlet port 132 of the 2-way solenoid valve 122 to the inlet port 134 of the 3-way solenoid valve 124. The outlet port 136 of the 3-way solenoid valve 124 has a line 156 which has a first branch line 156*a* connected to the inlet port 144 of the quick exhaust valve 144 and a second branch line 156*b* connected to the outlet port 142 of the check valve 126. A line 158 is connected to the exhaust outlet port 138 of the 3-way solenoid valve 124 and is connected by first branch line 158*a* to the exhaust port 64 of the PCM 26 and by a second branch line 158*b* to the exhaust outlet port 148 of the quick exhaust valve 128. A line 160 connects the two-way port 146 of the quick exhaust valve 128 to the delivery port 62 of the PCM 26.

During normal braking using the PCM 26 shown in the third embodiment, the following steps are effected:

1. Signal air passes in the supply port 60 of the PCM 26, and travels along lines 152, 152*a* to the inlet port 130 of the non-energized normally open 2-way solenoid valve 122.

2. The signal air passes through the inlet port 130 of the 2-way solenoid valve 122, around the plunger and out the outlet port 132 of the 2-way solenoid valve 122.

3. The signal air passes along line 154 and through the inlet port 134 of the non-energized 3-way solenoid valve 124, around the plunger and out the outlet port 136.

4. The signal air then passes along lines 156, 156*a*, through the quick exhaust valve 128 by traveling in the inlet port 144, around the diaphragm and out the open two-way port 146, to the delivery port 62 of the PCM 26 and then to the relay valve 48.

The check valve 126 is not used during application of the brakes in normal braking. Pressure on the second port 142 side of the check valve 126 is equal to pressure on the first port 140 side of the diaphragm. The diaphragm maintains contact with the second port 142, thereby preventing flow in from line 156*b*.

5. When the driver releases the brakes, pressure is released off of the inlet port 144 side of the quick exhaust valve 128 and off of the first port 140 side of the check valve 126. The signal air returns through the delivery port 62 of the PCM 26. The signal air will follow the path of least resistance and will flow along line 160, into the two-way port 146 of the quick exhaust valve 128, out the exhaust outlet port 148 of the quick exhaust valve 128, along lines 158*b*, 158*a*, to the exhaust vent 64 where the returning signal air is exhausted to atmosphere. The pressure on the two-way port 146 and the exhaust outlet port 148 side of the quick exhaust valve 128 from the returning signal air is greater than the pressure on the inlet port 144 side of the quick exhaust valve 128 (since signal air is no longer being applied) which causes the spring force, other biasing means used, to be overcome and to lift the diaphragm off of the seat 150 so that the signal air can flow from the two-way port 146 to the exhaust outlet port 148. The returning signal air will travel along this route through the quick exhaust valve 128 because the atmosphere is closer at the exhaust vent 64 than at the air exhaust by the driver's foot. In addition, signal air will flow through the quick exhaust valve 128, along lines 156*a*, 156*b*, through the check valve 126, through lines 152*b*, 152 to the supply port 60 and back to release at the driver's foot. The diaphragm in the check valve 126 is lifted off of the second port 142 and air can flow around the diaphragm because the pressure on the second side 142 is greater than the pressure on the first side 140 of the check valve 126 (since signal air is no longer being applied to the first 140 side of the check valve 126). All this contributes to a very rapid reduction in brake pressure.

During panic or emergency braking using the PCM 26 shown in the third embodiment, the following steps are effected:

1. Signal air flows through the PCM 26 as described above in steps 1–4 of normal braking. When the wheel sensors 54 sense that the wheel speed is too low and a lock-up is imminent because too much pressure is being applied, the ABS takes over. Electrical signals are sent from the wheel sensors 54 to the ECM 24 which activates the PCM 26.

2. The 3-way solenoid valve 124 is energized to vent air to atmosphere. The plunger moves and blocks the inlet port 134 and opens the exhaust outlet port 138. The air in lines 156a, 156 follows the path of least resistance and is exhausted to atmosphere by flowing in the outlet port 136 of the 3-way solenoid valve 126, out the exhaust outlet port 138 of the 3-way solenoid valve 126, along lines 158, 158*a* to the exhaust port 64 where it is exhausted to atmosphere. This reduces the pressure on the inlet port 144 side of the quick exhaust valve 128.

3. Returning signal air from the relay valve 48 is exhausted to atmosphere by return flow through the delivery port 62 of the PCM 62. The returning signal air flows along line 160 into the 2-way port 146 of the quick exhaust valve 128 and out the exhaust outlet port 148 of the quick exhaust valve 128. The returning signal air then flows along lines 158*b*, 158*a* to the exhaust port 64 and is vented to atmosphere. The diaphragm in the quick exhaust valve 128 is lifted off of the seat 150 because the pressure on the inlet port 144 side is less than the pressure on the 2-way port 146 and exhaust outlet port 148 side. Any returning air that flows past the diaphragm is exhausted to atmosphere by flowing through lines 156*a*, through the outlet port 136 of the 3-way solenoid valve 124, through the exhaust outlet port 138 of the 3-way solenoid valve 124, along lines 158, 158*a* to the exhaust port 64 where it is vented to atmosphere.

The check valve diaphragm remains seated against the second port 142 because pressure on the first port 140 side is greater than the pressure on the second port 142 side. The pressure that results from the backflow of air on the second port side 142 from line 156*b* is insufficient to overcome the pressure on the first port 140 side from the signal air being applied.

4. Once the wheel sensors 54 sense that the wheel speed has started to come back up, the 3-way solenoid valve 124 is de-energized so that the plunger moves against and blocks the exhaust outlet port 138. The 2-way solenoid valve 122 is then energized and the plunger blocks the outlet port 132. This holds the pressure constant. As the wheel starts to recover, the 2-way solenoid valve 122 is pulsed to give a controlled pressure re-application. Pressure jumps up to the point of imminent lock-up and the cycle is repeated starting at step 2 of this ABS sequence.

5. If the driver reduces the demand for brakes or suddenly releases the brakes when the solenoid valves 122, 124 are non-energized (2-way solenoid valve 122 has inlet and outlet ports 130, 132 open, and the 3-way solenoid valve 124 has the inlet port 134 and the outlet port 136 open and the exhaust outlet port 138 blocked) during panic or emergency breaking, pressure is released off of the inlet port 144 side of the quick exhaust valve 128 and off of the first port 140 side of the check valve 126. The signal air returns through the delivery port 62 of the PCM 26. The signal air will follow the path of least resistance and will flow along line 160, into the two-way port 146 of the quick exhaust valve 128, out the exhaust outlet port 148 of the quick exhaust valve 128, along lines 158b, 158a, to the exhaust vent 64 where the returning signal air is exhausted to atmosphere. The pressure on the two-way port 146 and the exhaust outlet port 148 side of the quick exhaust valve 128 from the returning signal air is greater than the pressure on the inlet port 144 side of the quick exhaust valve 128 (since signal air is no longer being applied) which causes the spring force, or other biasing means used, to be overcome and to lift the diaphragm off of the seat 150 so that the signal air can flow from the two-way port 146 to the exhaust outlet port 148. The returning signal air will travel along this route through the quick exhaust valve 128 because the atmosphere is closer at the exhaust vent 64 than at the air exhaust by the driver's foot. In addition, signal air will flow through the quick exhaust valve 128, along lines 156a, 156b, through the check valve 126, through lines 152b, 152 to the supply port 60 and back to release at the driver's foot. The diaphragm in the check valve 126 is lifted off of the second port 142 and air can allow flow around the diaphragm because the pressure on the second side 142 is greater than the pressure on the first side 140 of the check valve 126 (since signal air is no longer being applied to the first 140 side of the check valve 126). All this contributes to a very rapid reduction in brake pressure.

6. If the driver reduces the demand for brakes or suddenly releases the brakes when the 3-way solenoid valve 124 is energized (the inlet port 124 is blocked and the exhaust outlet port 138 and the outlet port 136 are open) during panic or emergency breaking, the returning signal air follows the path of least resistance. Returning signal air from the relay valve 48 is exhausted to atmosphere by return flow through the delivery port 62 of the PCM 26. The returning signal air flows along line 146 into the 2-way port 146 of the quick exhaust valve 128 and out the exhaust outlet port 148 of the quick exhaust valve 128. The returning signal air then flows along lines 158b, 158a to the exhaust port 64 and is vented to atmosphere. The diaphragm is lifted off of its seat 150 because the pressure on the inlet port 144 side is less than the pressure on the 2-way port 146 and the exhaust outlet port 148 side. Any returning air that flows past the diaphragm is exhausted to atmosphere by flowing through lines 156a, 156, through the outlet port 136 of the 3-way solenoid valve 124, through the exhaust outlet port 138 of the 3-way solenoid valve 124, along lines 158, 158a to the exhaust port 64.

7. If the driver reduces the demand for brakes or suddenly releases the brakes when the 2-way solenoid valve 122 is energized (the inlet port 130 is blocked and the outlet port 132 is open) during panic or emergency breaking, pressure is released off of the inlet port 140 side of the check valve 126 which causes the diaphragm in the check valve 126 to lift off of the second port 142. Air will flow back to the driver and be released at the drivers foot. Once pressure decreases sufficiently on the inlet port 144 side of the diaphragm in the quick exhaust valve 128, the returning air will cause the diaphragm in the quick exhaust valve 128 to be lifted off of its seat 150. Returning air will then flow through the delivery port 62 of the PCM 26. The signal air will follow the path of least resistance and will flow along line 160, through the 2-way port 146 of the quick exhaust valve 128, through the exhaust outlet port 148 of the quick exhaust valve 128, along lines 158b, 158a, and out the exhaust vent 64 to atmosphere. Air that flows around the diaphragm in the quick exhaust valve 128 will flow along lines 156a, 156, through the outlet port 136 of the 3-way solenoid valve 124, through the exhaust outlet port 138 of the 3-way solenoid valve 124, along lines 158, 158a to the exhaust port 64 to atmosphere. All this contributes to a very rapid reduction in brake pressure.

With this embodiment, the quick exhaust valve 128 is active for either a regular brake release or during a brake release initiated by the PCM 26. The advantage is that a very rapid pressure reduction is possible during ABS. This generally allows for better wheel control. In certain circumstances, however, wheel control can also be negatively impacted and the economy of combining the quick exhaust and bypass functions is no longer realized. It is to be understood that a quick exhaust valve, like quick exhaust valve 128, can used be instead of check valve 126. If such a quick exhaust valve is substituted for the check valve 126, a line would be provided to connect the quick exhaust outlet port, like exhaust outlet port 148, to the exhaust vent 64.

As can be seen from the above description of the embodiments of the PCM 26, the PCM 26 does not have the ability to provide a greater pressure at the delivery port 62 than is being received at the supply port 60. In other words, the PCM 26 only has the ability to reduce driver braking demand when the driver is braking too aggressively for the conditions.

It is to be understood that numerous implementations of the solenoid valves in the PCM 26 are possible including, for example, one proportional control solenoid valve or one 3-way solenoid valve which would operate in a pulse width modulated mode to approximate a pressure hold condition.

The incorporation of the quick exhaust valve 82, 128 in the PCM 26 helps with release timing and also helps to release contaminants from the service brake system 28. It also allows the PCM 26 to be located farther from the relay valve 48 wile still maintaining brake release timing considerations. Integrating the quick exhaust feature with the PCM 26 is especially advantageous as the ABS modulators normally require a check valve to bypass the solenoid valves and allow return airflow. This is required so that release timing is not negatively impacted and also so that if the driver reduces braking demand while the modulator is in a pressure hold condition, the reduced demand is still fulfilled at the brakes. With the implementation of the first and second embodiments, the quick exhaust valve 82 eliminates the need for a separate check valve and also provides the quick exhaust functionality.

Figure 9:
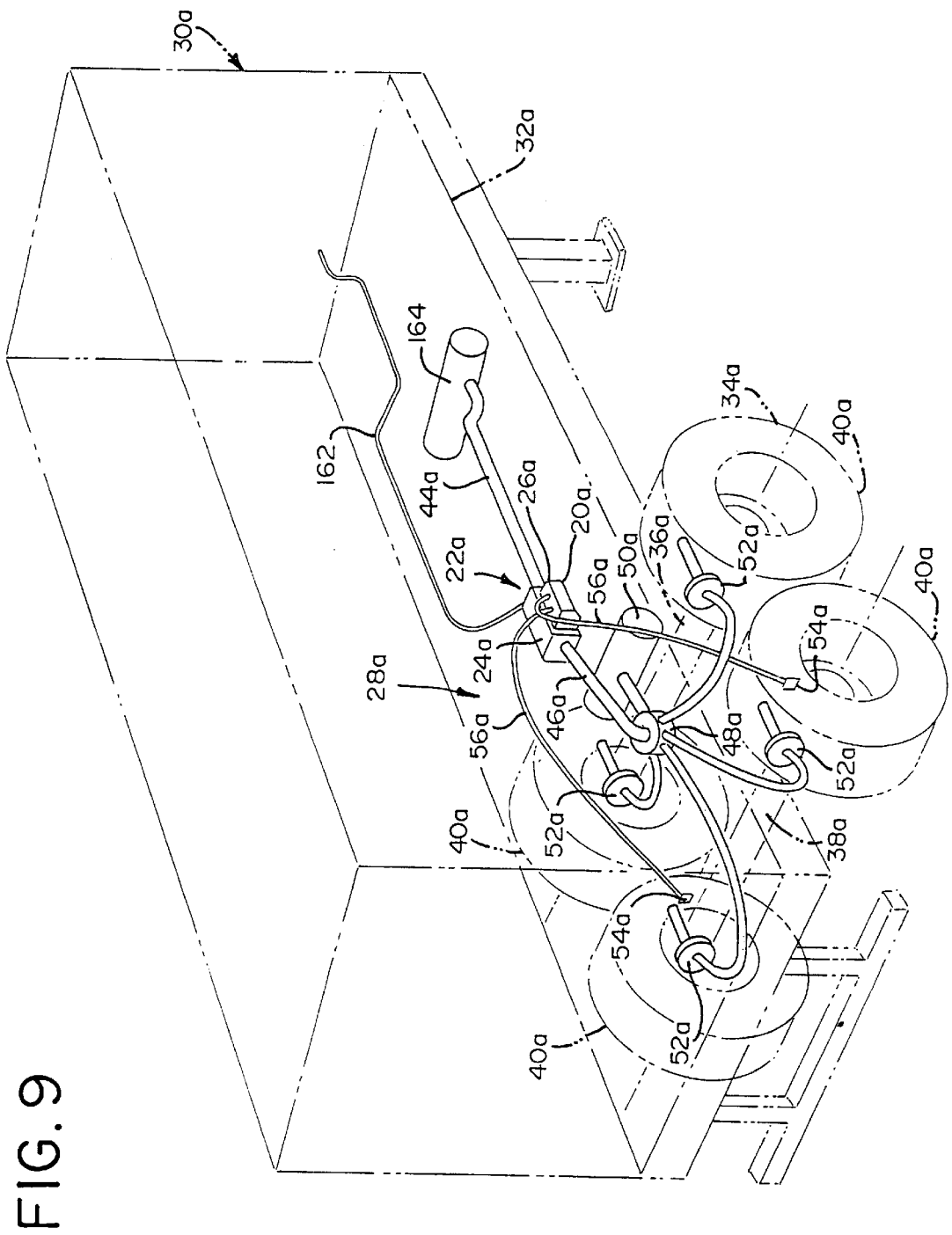
FIG. 9 is a perspective view of the antilock control module mounted on a trailer shown in phantom lines, such antilock control module being separated from a relay valve which is also shown mounted on the trailer.

FIG. 9 shows an alternate embodiment of the overall service brake system 28a installed on a conventional trailer 30a. The trailer 30a is identical to trailer 30, except that with this type of trailer 30a, the brake pedal in the tractor is electrically connected to the ECM 24a by a line in the tractor which is connected to a connection at the front of the trailer 30a which connection is connected to a line 162 that runs along the body of the trailer 30a. The brake pedal in the tractor and the PCM 26a are not pneumatically connected as is effected in the embodiment shown in FIG. 2. When a driver depresses the brake pedal, an electronic signal is sent to the ECM 24a.

The service brake system 28*a* is an air braked system. A first control line 44*a* is connected to a supply reservoir 164 mounted on the trailer 30*a*. A second control line 46*a* connects the PCM 26*a* to a conventional relay valve 48*a* and provides a direct fluid connection between the PCM 26*a* and the relay valve 48*a*. The ACM 20*a* and the relay valve 48*a* can be positioned in identical positions as in the embodiment shown in FIG. 2 and the same benefits are enjoyed in this embodiment relative to the positioning of the these two separate components. Other components, such as a valve (not shown), can also be connected to the second control line 46*a* by a branch line, but the PCM 26*a* and the relay valve 48*a* are in a direct fluid connection.

The overall structure of the PCM 26*a*, including the use of push-in fittings or the like, is identical to the PCM 26 and the same benefits are enjoyed with PCM 26*a* as are enjoyed with PCM 26.

During a normal braking operation using the trailer 30*a* of FIG. 9, when the driver depresses the pedal, an electrical signal is transmitted from the tractor to the ECM 24*a* of the ACM 20*a*. The ECM 24*a* signals the PCM 26*a* to function to pass a pneumatic (air) control signal from the supply reservoir 164 along first control line 44*a* and then through the PCM 26*a* as described herein. The PCM 26*a* is always kept under pressure from the supply reservoir 164. The control signal then passes through the second control line 46*a* to the relay valve 48*a*. The relay valve 48*a* allows air to flow from the supply reservoir 50*a* mounted on the trailer 30*a* to the brake chambers 52*a* until the pressure fed to the brake chambers 52*a* is essentially the same as the control pressure applied to the relay valve 48*a* from the second control line 46*a*. If anti-lock activation is required to prevent wheel lock-up, the ECM 24*a* and the PCM 26*a* act together to reduce pressure to a level which minimizes or prevents wheel lock as described herein. Conventional wheel sensors 54*a* mounted on the trailer 30*a* sense the speed of the wheels 40*a* and feed information to the ECM 24*a* via lines 56*a*.

Figure 10:
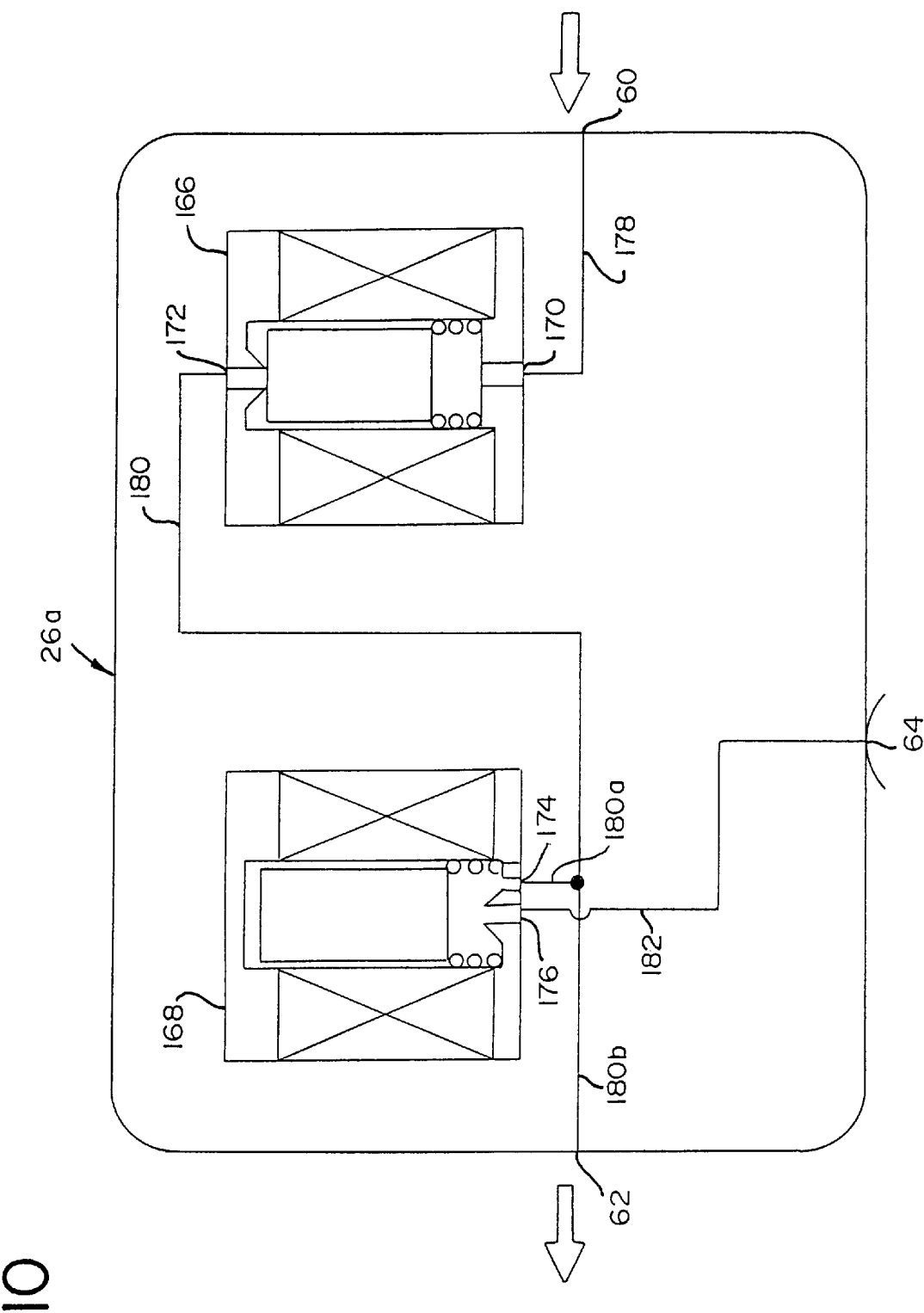
FIG. 10 is a schematic diagram of the elements of a fourth embodiment of the pneumatic control module which is used with the trailer shown in FIG. 9.

The PCM 26*a* shown in FIG. 10 is used with the trailer 30*a*. The PCM 26*a* includes a first 2-way solenoid valve 166 which is normally closed and a second 2-way solenoid valve 168 which is normally open. The inlet port 60 is always pressurized.

The first 2-way solenoid valve 166 has a housing having an inlet port 170 and an outlet port 172. A plurality of windings are housed within the housing and encircle a plunger which is biased against the outlet port 172 by a spring and can be selectively moved away from the outlet port 172 when the 2-way solenoid valve 166 is energized. In the non-energized position, the first 2-way solenoid valve 166 is closed such that the plunger is biased against the outlet port 172 and an air signal cannot flow therethrough.

The second 2-way solenoid valve 168 has a housing having an inlet port 174 and an outlet port 176. A plurality of windings are housed within the housing and encircle a plunger is biased away from the outlet port 176 by a spring and can be selectively moved against the outlet port 176 when the second 2-way solenoid valve 168 is energized. In the non-energized position, the second 2-way solenoid valve 168 is open such that the air signal can flow therethrough. That is, the plunger is biased away from the outlet port 176.

A line 178 is connected to the supply port 60 of the PCM 26*a* and is connected to the inlet port 170 of the first 2-way solenoid valve 166. The outlet port 172 of the first 2-way solenoid valve 166 has a line 180 which has a first branch line 180*a* connected to the inlet port 174 of the second 2-way solenoid valve 168 and a second branch line 180*b* connected to the delivery port 62 of the PCM 26*a*. The outlet port 176 of the second 2-way solenoid valve 168 is connected to the exhaust port 64 by line 182.

During normal braking using the PCM 26*a* shown in FIG. 10, the following steps are effected:

1. The solenoid valves 166, 168 are energized to open normally closed solenoid valve 166 and to close normally open solenoid valve 168 until the desired brake pressure level is reached. This allows the air which is under pressure from the reservoir 164 to pass through the solenoid valve 166. Air passes in the supply port 60, and travels along line 178 to the inlet port 172 of the energized first 2-way solenoid valve 166.

2. The air passes through the inlet port 170 of the first 2-way solenoid valve 166, around the plunger and out the outlet port 172.

3. The air passes along lines 180, 180*b* and out the delivery port 62 of the PCM 26*a* and to the relay valve 48*a*.

4. After the desired brake pressure level is reached, the first 2-way solenoid valve 166 is de-energized to close it and to effect a pressure hold. The second 2-way solenoid valve 168 remains energized.

5. When the driver releases the brakes, the ECM 24*a* signals PCM 26*a* to de-energize both 2-way solenoid valves 166, 168, such that the first solenoid valve 166 is closed and the second solenoid valve 168 is open. As such, air cannot flow through the first 2-way solenoid valve 166 such that pressure is relieved from the remainder of the PCM 26*a*. The air returns through the delivery port 62 of the PCM 26*a*. The signal air flows along lines 180*b*, 180*a*, into the inlet port 174 of the second two-way solenoid valve 168, out the outlet port 176, along line 182, and to the exhaust port 64 of the PCM 26*a* at which point the returning air is vented to atmosphere. This contributes to a very rapid reduction in brake pressure.

During panic or emergency braking using the PCM 26*a*, the following steps are effected:

1. Signal air flows through the PCM 26*a* as described above in steps 1–4 of normal braking. When the wheel sensors 54*a* sense that the wheel speed is too low and a lock-up is imminent because too much pressure is being applied, the ABS takes over. Electrical signals are sent from the wheel sensors 54*a* to the ECM 24*a* which controls the PCM 26*a*.

2. The ECM 24*a* signals the PCM 26*a* to de-energize the solenoid valves 166, 168, such that the first solenoid valve 166 is closed and the second solenoid valve 168 is opened. As such, air cannot flow through the first 2-way solenoid valve 166 such that pressure is relieved from the remainder of the PCM 26*a*.

3. Returning signal air from the relay valve 48 is exhausted to atmosphere by return flow through the delivery port 62 of the PCM 26. The air flows along lines 180*b*, 180*a*, into the inlet port 174 of the second two-way solenoid valve 168, out the outlet port 176, along line 182, and to the exhaust port 64 of the PCM 26*a* and is vented to atmosphere.

4. Once the wheel sensors 54*a* sense that the wheel speed has started to come back up, the ECM 24*a* signals the PCM 26*a* to energize the second 2-way solenoid valve 168 to close it. This holds the pressure constant in the PCM 26*a* as air cannot be vented to atmosphere.

5. As the wheel starts to recover, the first 2-way solenoid valve 166 is pulsed to give a controlled pressure re-application. Pressure jumps up to the point of imminent lock-up and the cycle is repeated starting at step 2 of this ABS sequence.

Also, with the embodiment shown in FIG. 10, one or more additional solenoids may be incorporated into the PCM 26a to provide a backup pneumatic control operation. A pressure sensor to sense output pressure may also be provided.

A quick exhaust valve is not provided in the embodiment shown in FIG. 10. Instead, brake pressure reduction is under electronic control. A rapid pressure reduction and replenishment of air in the control line can be accomplished. If an even more rapid pressure reduction is required, however, a quick exhaust valve 128, like that of FIG. 8, can be provided. A quick exhaust valve 128 can also be provided as part of the backup pneumatic system.

While preferred embodiments of the present invention are shown and described, it is envisioned that those skilled in the art may devise various modifications of the present invention without departing from the spirit and scope of the appended claims.

The invention claimed is:

1. A brake system for an air braked trailer comprising:
a first length of tubing for transmitting air from a source;
a second length of tubing for transmitting air;
a relay valve allowing air to flow therethrough, and
a pneumatic control module having a supply port, a delivery port and means for reducing pressure from said supply port to said delivery port, said supply port being connected to said first length of tubing, and said pneumatic control module being connected to said relay valve by connection of said second length of tubing to said delivery port of said pneumatic control module and to said relay valve.

2. A brake system as defined in claim 1, further comprising an electronic control module connected to said pneumatic control module for sending instructions to said means to reduce pressure.

3. A brake system as defined in claim 2, wherein said electronic control module is integrally formed with said pneumatic control module.

4. A brake system as defined in claim 1, further comprising an exhaust valve integrally connected with said pneumatic control module, said exhaust valve being capable of exhausting air to atmosphere during a normal brake release.

5. A brake system as defined in claim 4, wherein said exhaust valve includes an inlet port and an exhaust outlet port, said inlet port of said exhaust valve being in fluid communication with said first length of tubing, said exhaust outlet port capable of exhausting air to atmosphere, and means for preventing flow of air from said inlet port of said exhaust valve to said exhaust outlet port.

6. A brake system as defined in claim 5, wherein said pneumatic control module further includes a check valve in fluid communication with said first length of tubing and said exhaust valve.

7. A brake system as defined in claim 5, wherein said pneumatic control module further includes a second exhaust valve in fluid communication with said first length of tubing and said first mentioned exhaust valve, said second exhaust valve capable of exhausting air to atmosphere.

8. A brake system as defined in claim 5, wherein said means for preventing flow of air from said inlet port of said exhaust valve to said exhaust outlet port comprises a diaphragm.

9. A brake system as defined in claim 5, wherein said means for reducing pressure from said supply port of said pneumatic control module to said delivery port of said pneumatic control module comprises at least one solenoid valve.

10. A brake system as defined in claim 9, wherein said exhaust valve further includes an exhaust inlet port connected to said at least one solenoid valve for allowing exhaust air to flow from said at least one solenoid valve into said exhaust valve, and said means for preventing flow of air from said inlet port of said exhaust valve to said exhaust outlet port further is selectively capable of allowing air to pass from said exhaust inlet port to said exhaust outlet port.

11. A brake system as defined in claim 1, wherein said means for reducing pressure from said supply port of said pneumatic control module to said delivery port of said pneumatic control module comprises at least one solenoid valve.

12. A brake system as defined in claim 1, wherein said first and second lengths of tubing are capable of being decoupled from said pneumatic control module.

13. A brake system as defined in claim 12, wherein said first and second lengths of tubing are connected to said pneumatic control module by manually releasable fittings.

14. A brake system as defined in claim 12, wherein said first and second lengths of tubing are connected to said pneumatic control module by compression fittings.

15. A brake system as defined in claim 1, wherein said second length of tubing can be cut to a desired length.

16. A method of using an assembly for a brake system of an air braked trailer comprising:
providing a first length of tubing for transmitting air from a source;
providing a second length of tubing for transmitting air; and
providing a pneumatic control module having a supply port, a delivery port and means for reducing pressure from said supply port to said delivery port, said supply port being connected to said first length of tubing, and said delivery port being connected to said second length of tubing, said first and second lengths of tubing being capable of being decoupled from said pneumatic control module;
disconnecting said lengths of tubing from said pneumatic control module;
connecting said lengths of tubing to each other;
operating said assembly; and
thereafter replacing or repairing said relay valve or said pneumatic control module.

17. A method as defined in claim 16, wherein said first and second lengths of tubing are connected to said pneumatic control module by manually releasable fittings.

18. A method as defined in claim 16, wherein said first and second lengths of tubing are connected to said pneumatic control module by compression fittings.

19. A pneumatic control module for a brake system of an air braked trailer comprising: a supply port and a delivery port, means for reducing pressure from said supply port to said delivery port, and an exhaust valve including an inlet port and an exhaust outlet port, said exhaust outlet port capable of exhausting air to atmosphere, and means for preventing flow of air from said inlet port of said exhaust valve to said exhaust outlet port.

20. A pneumatic control module as defined in claim 19, wherein said means for reducing pressure from said supply port to said delivery port comprises at least one solenoid valve.

21. A pneumatic control module as defined in claim 19, further including a check valve in fluid communication with said exhaust valve.

22. A pneumatic control module as defined in claim 19, further including a second exhaust valve including an inlet port and an exhaust outlet port which is capable of exhausting air to atmosphere, and second means for preventing flow of air from said inlet port of said second exhaust valve to said exhaust outlet port of said second exhaust valve.

23. A pneumatic control module as defined in claim 19, wherein said means for preventing flow of air from said inlet port of said exhaust valve to said exhaust outlet port comprises a diaphragm.

24. A pneumatic control module as defined in claim 19, wherein said exhaust valve further includes an exhaust inlet port in fluid communication with said delivery port for allowing exhaust air to flow from said delivery port into said exhaust valve, and said means for preventing flow of air from said inlet port of said exhaust valve to said exhaust outlet port further is selectively capable of allowing air to pass from said exhaust inlet port to said exhaust outlet port.

25. A trailer comprising:
   a frame;
   a plurality of wheels;
   each said wheel having a brake chamber associated therewith; and
   an air braked brake system comprising:
   a length of tubing,
   a supply reservoir mounted on said frame,
   a relay valve connected to said length of tubing, said relay valve allowing air to flow from said supply reservoir to said brake chambers until the pressure fed to said brake chambers is approximately the same as the pressure applied to said relay valve from said length of tubing, said relay valve being mounted on said frame at a first position, and
   a pneumatic control module having a supply port and a delivery port, said pneumatic control module reducing pressure from said supply port to said delivery port, said pneumatic control module being mounted on said frame at a second position which is spaced from said relay valve, said pneumatic control module and said relay valve being connected together by said length of tubing.

26. A trailer as defined in claim 25, wherein said first position at which said relay valve is mounted is generally equidistant from said wheels.

27. A trailer as defined in claim 26, wherein said second position at which said pneumatic control module is mounted is forward of said wheels.

28. A trailer as defined in claim 25, wherein said length of tubing is capable of being-decoupled from said pneumatic control module, and further including a second length of tubing connected to said pneumatic control module, each said length of tubing being capable of being decoupled from said pneumatic control module.

29. A trailer as defined in claim 25, wherein said pneumatic control module includes exhaust valve therein which is capable of exhausting air to atmosphere.

30. A trailer as defined in claim 29, wherein said exhaust valve includes an inlet port and an exhaust outlet port, and means for preventing flow of air from said inlet port of said exhaust valve to said exhaust outlet port.

31. A trailer as defined in claim 30, wherein said means for preventing flow of air from said inlet port of said exhaust valve to said exhaust outlet port comprises a diaphragm.

32. A trailer as defined in claim 29, wherein said pneumatic control module further includes a check valve in fluid communication with said exhaust valve.

33. A trailer as defined in claim 29, wherein said pneumatic control module further includes a second exhaust valve therein which is capable of exhausting air to atmosphere.

34. A trailer as defined in claim 29, wherein said means for reducing pressure from said supply port of said pneumatic control module to said delivery port of said pneumatic control module comprises at least one solenoid valve.

35. A trailer as defined in claim 34, wherein said exhaust valve further includes an exhaust inlet port connected to one of said solenoid valves for allowing exhaust air to flow from said one solenoid valve into said exhaust valve, and said means for preventing flow of air from said inlet port of said exhaust valve to said exhaust outlet port further is selectively capable of allowing air to pass from said exhaust inlet port to said exhaust outlet port.

* * * * *